(12) United States Patent
Deckard (10) Patent No.: US 10,301,227 B2
(45) Date of Patent: May 28, 2019

(54) SOIL IMPROVING COMPOSITIONS AND METHODS OF USING

(71) Applicant: DTA Consulting LLC, Reedsburg, WI (US)

(72) Inventor: Paul G. Deckard, Reedsburg, WI (US)

(73) Assignee: DTA Consulting, LLC, Reedsburg, WI (US)

( * ) Notice: Subject to any disclaimer, the term of this patent is extended or adjusted under 35 U.S.C. 154(b) by 174 days.

(21) Appl. No.: 15/487,801

(22) Filed: Apr. 14, 2017

(65) Prior Publication Data

US 2017/0297965 A1    Oct. 19, 2017

Related U.S. Application Data

(60) Provisional application No. 62/322,428, filed on Apr. 14, 2016.

(51) Int. Cl.
| | |
|---|---|
| *C05D 3/02* | (2006.01) |
| *C05D 1/00* | (2006.01) |
| *C05B 17/00* | (2006.01) |
| *C09K 17/06* | (2006.01) |

(52) U.S. Cl.
CPC ............... *C05D 3/02* (2013.01); *C05B 17/00* (2013.01); *C05D 1/00* (2013.01); *C09K 17/06* (2013.01)

(58) Field of Classification Search
CPC .. C05D 3/02; C05D 1/00; C09K 17/06; C05B 17/00
See application file for complete search history.

(56) References Cited

U.S. PATENT DOCUMENTS

| 2,342,121 A * | 2/1944 | Ciell ........................ B24D 3/18 |
|---|---|---|
| | | 51/308 |
| 2010/0064747 A1* | 3/2010 | Greer ....................... C05D 9/02 |
| | | 71/11 |

FOREIGN PATENT DOCUMENTS

CN         105085070 A  * 11/2015

OTHER PUBLICATIONS

Mayhew, Lawrence. "Humic substances in biological agriculture." Rev ACRES 34.1-2 (2004): 80-88.*

* cited by examiner

*Primary Examiner* — Jennifer A Smith
(74) *Attorney, Agent, or Firm* — Polsinelli PC (57) ABSTRACT

Soil improving compositions and methods of using the compositions for improving soil properties are described.

12 Claims, 5 Drawing Sheets

SOIL IMPROVING COMPOSITIONS AND METHODS OF USING

CROSS-REFERENCE TO RELATED APPLICATIONS

The present application claims priority under 35 U.S.C. § 119 to U.S. Provisional Patent Application No. 62/322,428, filed on Apr. 14, 2016, titled "SOIL IMPROVING COMPOSITIONS AND METHODS OF USING", which is hereby incorporated by reference in its entirety into the present application.

FIELD OF THE INVENTION

The invention describes soil improving compositions and methods of using the same.

BACKGROUND OF THE INVENTION

The fertilization of plants is as old as human civilization. The notion of supplementing soil with natural and synthetic sources of nitrogen, phosphorus, potassium and minerals to stimulate robust plant growth is well known. As a result, plants have been fertilized with animal manures, vegetative composts, seaweed, fish and animal byproducts, and synthetic aqueous soluble fertilizer compositions. While all of these approaches have met with a degree of success, there is a growing appreciation that improved plant growth and management of soil nutrients is obtained by improving the physical, chemical, and biochemical properties of soil, thereby promoting a vibrant soil ecosystem to benefit plant growth. A thriving soil ecosystem promotes the breakdown of complex substances into a form in which the nutrients contained therein are available to the plant. Additionally, the soil ecosystem through metabolism tends to meter nutrients to the plant at a rate that promotes better plant growth, as compared to soil dosing with water soluble nutrients.

Due to the intensive cultivation methods used in current conventional agricultural practices, there is a realization that manure alone, or fertilizers alone, is a relatively inefficient use of these resources causing pollution of the aqueous and atmospheric environments, and the degradation of soil quality. Therefore, there is a continuing need for new soil amendments capable of conserving natural resources and improving soil properties.

An all-natural soil amendment that provides many advantages over current chemical fertilizers has been invented. First, the use of composted manure provides a vast population of microbes. Microbes are the life of the soil and an indispensable component in healthy soil. Microbes digest organic matter and break down nutrients in the soil into a form that the plant can use. Second the soil improving composition provides a home for the microbes in the form of calcite, so the microbial population expands rapidly. We are providing and rapidly rebuilding the structure to the soil where the microbes will live and thrive. This improved soil structure also helps to hold or release water and nutrients needed by the plant. Third, commercial fertilizers tear down organic matter in the soil, while the soil improving composition helps to build up organic matter in the soil. Fourth, healthy soil results in a healthier, more robust, plant that is less susceptible to disease, resulting in larger yields of grain or fruit. And finally, the soil improving composition breaks free soil bound nutrients, such as nitrogen and phosphorus, which are locked in the soil. These nutrients can then be converted into a form which can be utilized by the plant—a process which reduces the need for added synthetic fertilizers and thereby reduces the negative impact that synthetic fertilizers have on the environment.

BRIEF DESCRIPTION OF THE FIGURES

The application file contains at least one photograph executed in color. Copies of this patent application publication with color photographs will be provided by the Office upon request and payment of the necessary fee.

The following drawings form part of the present disclosure and are included to further demonstrate certain aspects of the present disclosure. The disclosure may be better understood by reference to one or more of these drawings in combination with the detailed description of specific aspects presented herein.

DETAILED DESCRIPTION OF THE INVENTION

As required, detailed embodiments of the present inventions are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

A soil amendment composition has been discovered that can significantly improve the physical, chemical, and biochemical properties of a cultivated soil, while supporting plant growth. Surprisingly, when combined with organic material normally used to improve soil conditions, the soil improving composition of the invention significantly improves the soil qualities beyond those qualities attributable to the organic matter input alone. Therefore, the present invention is also directed to a composition for improving the soil enhancing properties of organic material.

I. Composition

In one aspect, a soil improving composition is provided. A soil improving composition of the present invention comprises gypsum, borax, weathered lignite, and crystalline calcite calcium. The composition and characteristics of each component of the composition is described below.

A. Gypsum

Gypsum is a soft sulfate mineral composed of calcium sulfate dihydrate, with the chemical formula $CaSO_4 \cdot 2H_2O$. Gypsum forms as an evaporite mineral and as a hydration product of anhydrite ($CaSO_4$). The calcium sulfate dihydrate may be obtained from a variety of sources but certain chemical specifications must be met. In addition to the typical concentrations of calcium and sulfur in either natural or mined gypsum (about 22% and about 18%, respectively), the following chemical properties outlined in Tables 1-3 are preferred:

TABLE 1

Preferred concentration of beneficial elements in gypsum.

| Element | mg/kg |
| --- | --- |
| Antimony | 1-2 |
| Chromium | 2-12 |
| Selenium | 1-4 |
| Strontium | 80-200 |
| Vanadium | 1-50 |

TABLE 2

Preferred concentration of micronutrients in gypsum.

| Micronutrient | mg/kg |
| --- | --- |
| Boron | 4-8 |
| Cobalt | 1-10 |
| Iron | 400-600 |
| Manganese | 5-7 |
| Nickel | 1-7 |
| Zinc | 6-50 |

TABLE 3

Preferred concentration of potential harmful elements in gypsum.

| Element | mg/kg |
| --- | --- |
| Arsenic | <1 |
| Cadmium | <0.05 |
| Chloride | <22 |
| Lead | <0.5 |
| Mercury | <1 |

Boron, cobalt, copper, iron, manganese, nickel, and zinc are recognized in the art as essential plant micronutrients. As the invention is intended to benefit primarily the soil ecosystem by encouraging soil microbiological activity as a means of generating bioavailable plant and microbial nutrients, and as the invention is intended to benefit livestock as well as human health, the composition of the invention includes trace elements that improve the health and productivity of the soil food web as well as plants. By including certain chemical elements in the invention, livestock and human health benefit from these elements. For example, antimony is necessary for the production of growth stimulating auxins in rhizobacteria associated with rhyzosphere interactions that release plant growth stimulants. Chromium increases the bioavailability of calcium, magnesium, copper, boron, and nickel, and regulates imbalances in iron, manganese and vanadium. Selenium is an essential element needed for both plants and microbes for pest resistance, disease resistance, the production of selenomethionine and selenocysteine, antioxidant, and antagonizes toxic mercury, cadmium, and lead chemical species. Strontium substitutes for calcium in biological systems that are under stress, acting as a regulator of calcium, prevention of bone loss in livestock and humans, especially in humans to prevent bone fractures from osteoporosis. Vanadium is needed for optimum growth of dairy cattle. Interacts synergistically with selenium and is an essential element for numerous enzymes synthesized by soil algae, bacteria and fungi in the soil food web. It is an especially critical component for reducing reliance on highly soluble nitrogen fertilizers by acting as a cofactor of nitrogenase enzymes used for nitrogen fixation by nitrogen-fixing bacteria.

The preferred particle size for gypsum as used in the present invention is between about 50 microns to about 200 microns, preferably 75 microns.

A soil improving composition of the present invention may comprise between about 50% to about 90% gypsum. Preferably, a soil improving composition comprises from about 55% to about 80% gypsum, even more preferably from about 65% to about 75% gypsum. Most preferred is a soil improving composition comprising about 72% gypsum.

B. Borax

The term borax is used for a number of closely related minerals or chemical compounds that differ in their crystal water content, but usually refers to the decahydrate form of borax. Most commonly, borax, for the purpose of the invention, refers to either sodium tetraborate or sodium tetraborate pentahydrate, having the has the chemical formulas $Na_2B_4O_7.10H_2O$ or $Na_2[B_4O_5(OH)_4].8H_2O$. The preferred particle size for borax is between about 50 microns and about 200 microns, preferably 75 microns. Borax is commonly found in many detergents, cosmetics, and enamel glazes. It is also used to make buffer solutions in biochemistry, as a fire retardant, as an anti-fungal compound, in the manufacture of fiberglass, as a flux in metallurgy, neutron-capture shields for radioactive sources, a texturing agent in cooking, and as a precursor for other boron compounds.

Borax is used in the present invention to reduce hydrogen sulfide odors during the composting process by inhibiting the enzymes produced by sulfate reducing bacteria, thus conserving sulfates and reducing sulfides that are toxic to microorganisms and harmful to the environment. Borax is also used to block the microbial respiration pathway that chemically reduces nitrates to $NH_3$ (ammonia) under anaerobic conditions by inhibiting urease enzymes, thus capturing more nitrogen in the compost, allowing more $NH_3$ to become bound as organic nitrogen by capturing more of the $NH_3$ within the compost pile. When applied to soils, borax acts as a synergist to calcium to improve the bioavailability of calcium, leading to improved plant uptake of calcium. Higher plant calcium levels in plants are critical to promoting root growth and increased pest resistance.

A soil improving composition of the present invention may comprise between about 0.1% to about 10% borax. Preferably, a soil improving composition comprises from about 0.5% to about 7.5% borax, even more preferably from about 1 to about 5% borax. Most preferred is a soil improving composition comprising about 2.8% borax.

C. Weathered Lignite

Weathered lignite (or leonardite) is a soft waxy, black or brown, shiny, vitreous mineraloid that is soluble in aqueous alkaline solutions and slightly soluble in aqueous acidic solutions. The portion of weathered lignite that is insoluble in both alkali and acid aqueous solution is called humin, which is a recalcitrant component of natural soils responsible for detoxification of a wide variety of both naturally occurring and anthropogenic toxins. Weathered lignite is an oxidation product of the biogeochemical weathering of low grade lignite and sub-bituminous coal, associated with near-surface mining. It is a rich source of humic acid and is used as a soil conditioner, as a stabilizer for ion-exchange resins in water treatment, in the remediation of polluted environments, and as a drilling additive. Preferably, weathered lignite suitable for use in a composition of the present invention comprises at least 50% humic acid, and at least 2% hydrophobic fulvic acids. The content of humic acids and hydrophobic fulvic acids is determined by the analytical method published in the Journal of the AOAC Vol. 97, No. 3, pp 721-730. Humic substances are known to adsorb and stabilize ammonia, nitrites, nitrates, cyanates, and ammonium chemical species.

The preferred physical properties of weathered lignite are between about 50 microns and about 200 microns, preferably 75 microns. A preferred source of weathered lignite for the present invention is obtained in South Dakota. The preferred geochemical properties of weathered lignite, as analyzed by ICP-emission spectrometry following lithium metaborate/tetraborate fusion and dilute nitric acid digestion geochemical analysis are described on Tables 4-7:

Most preferred is a soil improving composition comprising about 9.6% weathered lignite. An exemplary soil improving composition comprises about 9.6% weathered lignite comprising at least 50% humic acid, and at least 2% hydrophobic fulvic acids.

D. Calcite

Calcite is a calcium carbonate mineral that is either non-crystalline or crystalline. The crystalline varieties present crystalline numerous crystal habits including acute to obtuse rhombohedra, tabular forms, prisms, or various scalenohedra with over 600 forms reported, and possibly thousands of crystalline habits may exist. Calcite crystals are trigonal-rhombohedral, and are the most stable polymorphs of the crystalline forms of calcium carbonate ($CaCO_3$).

TABLE 4

Preferred concentration and range of major chemical elements loss on ignition

| | Si % | Al % | Fe % | Mg % | Ca % | Na % | K % | Ti % | P % | Mn % | Cr % | Total Carbon % | Total Sulfur % | Organic Carbon % | Loss on Ignition % |
|---|---|---|---|---|---|---|---|---|---|---|---|---|---|---|---|
| Preferred | 3.7 | 0.7 | 1.3 | 0.5 | 2.6 | 1.4 | 1.1 | 0.1 | 0.03 | 0.015 | 0.001 | 43 | 1 | 40 | 81 |
| Low | 1.6 | 0.3 | 0.7 | 0.3 | 1.4 | 0.3 | 0.2 | 0.0 | 0.0 | 0.011 | 0.0004 | 38 | 0.4 | 38 | 74 |
| High | 5.5 | 1.1 | 1.8 | 0.7 | 3.8 | 2.5 | 2.1 | 0.1 | 0.1 | 0.020 | 0.001 | 48 | 2 | 42 | 89 |

TABLE 5

Preferred concentration and range of trace elements in weathered lignite

| | Ba ppm | Be ppm | Co ppm | Cs ppm | Ga ppm | Hf ppm | Nb ppm | Rb ppm | Sr ppm | Ta ppm | Th ppm | U ppm | V ppm | W ppm | Zr ppm | Y ppm |
|---|---|---|---|---|---|---|---|---|---|---|---|---|---|---|---|---|
| Preferred | 752 | 2 | 3 | 1 | 4 | 1 | 7 | 15 | 376 | 1 | 3 | 3 | 30 | 2 | 45 | 10 |
| Low | 336 | 1.4 | 1.3 | 0.3 | 1.5 | 0.7 | 1.4 | 5 | 200 | 0.1 | 1 | 1 | 13 | 1 | 21 | 7 |
| High | 1139 | 3.0 | 5.2 | 2.3 | 6.7 | 1.9 | 13 | 24 | 552 | 1.2 | 5 | 5 | 46 | 2 | 69 | 13 |

TABLE 6

Preferred trace and potentially harmful elemental concentration ranges in weathered lignite

| | Mo ppm | Cu ppm | Pb ppm | Zn ppm | Ni ppm | As ppm | Cd ppm | Sb ppm | Bi ppm | Hg ppm | Tl ppm | Se ppm |
|---|---|---|---|---|---|---|---|---|---|---|---|---|
| Preferred | 3.2 | 12 | 0 | 13.8 | 7.8 | 0.0 | 0.0 | 0.7 | 0.0 | 0.0 | 0.0 | 2.0 |
| Low | 1.0 | 4.3 | n/a | 4.9 | 3.5 | n/a | n/a | 0.2 | n/a | n/a | n/a | 1.2 |
| High | 5.3 | 19 | 14 | 22.7 | 12.0 | 10 | 0.3 | 1.1 | 0.3 | 0.2 | 0.1 | 2.2 |

TABLE 7

Preferred concentration of lanthanide elements in weathered lignite

| | La ppm | Ce ppm | Pr ppm | Nd ppm | Sm ppm | Eu ppm | Gd ppm | Tb ppm | Dy ppm | Ho ppm | Er ppm | Tm ppm | Yb ppm | Lu ppm |
|---|---|---|---|---|---|---|---|---|---|---|---|---|---|---|
| Preferred | 11 | 23 | 3 | 11 | 2 | 0.5 | 1.8 | 0.3 | 1.5 | 0.3 | 0.9 | 0.1 | 0.8 | 0.1 |
| Low | 8 | 17 | 2 | 9 | 2 | 0.4 | 1.4 | 0.2 | 1.3 | 0.3 | 0.8 | 0.1 | 0.7 | 0.1 |
| High | 15 | 32 | 4 | 17 | 3 | 0.7 | 2.6 | 0.4 | 2.1 | 0.4 | 1.1 | 0.2 | 1.1 | 0.2 |

The preferred cation exchange capacity of the weathered lignite as analyzed by EPA SW-9081 Test Methods for Evaluating Solid Waste, Physical/Chemical Methods, SW-846, is 140 milliequivalents per 100 grams.

A soil improving composition of the present invention may comprise between about 1% to about 25% weathered lignite. Preferably, a soil improving composition comprises from about 2.5% to about 20% weathered lignite, even more preferably from about 5% to about 15% weathered lignite.

Other polymorphs of calcium carbonate include the minerals aragonite and vaterite. Aragonite will change to calcite at 380-470° C., and vaterite is even less stable. Calcite crystals may be trigonal-rhombohedral, and show a variety of habits including acute to obtuse rhombohedra, tabular forms, prisms, or various scalenohedra. Calcite exhibits several twinning types adding to the variety of observed forms. Calcite may occur as fibrous, granular, lamellar, or compact crystals.

Calcite suitable for use in a composition of the present invention may be from the natural processes of biomineralization where chiral morphologicially enantiomeric crystalline calcite is the major component of biogenic crystalline calcium carbonate. Biogenic calcite is the primary constituent of shells of marine organisms, bivalves such as oysters and rudists, the hard parts of red algae, some sponges, brachiopods, echinoderms, some serpulids, and most bryozoa, and parts of the shells of snails. However, the preferred calcite would be typified by only some foraminifera, such as the cocliths of the cocolithophoridae. More often than not, these polymorphs of biomineralized calcium carbonate are accompanied by substantial amounts of amorphous (non-crystalline) calcium carbonates that do not present crystalline surfaces and typically have a chemical composition ratio of calcium:calcium+magnesium (Ca:Ca+Mg) greater than 5. Biogenic crystalline calcium carbonate with a chemical composition ratio of Ca:Ca+Mg of <5 (which is typically >5 in amorphous calcite) is preferred in the invention. More preferable is a Ca:Ca+Mg ratio in the range of <1 to 4.

Chiral crystalline calcite that presents a crystalline habit that is morphologically enantiomeric is known to preferentially adsorb L-amino acids, the only form of biologically active amino acids, and other biologically active forms of organic molecules, from racemic mixtures due to the presence of chiral surfaces. Although calcite is typically referred to as a symmetrical rhombohedra, the ability of certain calcite habits to preferentially adsorb L-amino acids clearly indicates the presence of levorotary (L) enantiomer crystal habits that provide surface charge, mineralogy, chemistry of solution (ionic strength), and hydrophobicity conditions that are necessary for thermodynamically favorable adsorption of bioactive organic substances, clearly indicate the presence of chiral asymmetry. These are also the same conditions necessary for bacterial adhesion. Previously, scientists perceived the rhombohedral cleavage of calcites to present a perfect uniform surface structure of coplanar Ca and $CO_3$. However, calcite surfaces are composed of intersections of coplanar arrays of calcium and CO3 that create "steps" where they intersect resulting in a complex chiral surface that provides a template for abiotic adsorption and biotic adhesion. Furthermore, some stepped calcite surfaces are more chiral than others; therefore the potential for enantioselectivity and concomitant biological activity associated with the calcite mineral will vary depending on the mineral surface chirality. A calcite with a crystalline habit surface that presents enantiomeric surface crystallography with a chiral index in the range of 1.73 to 2.60 Å across its h k l surfaces is preferred.

Figure 1:
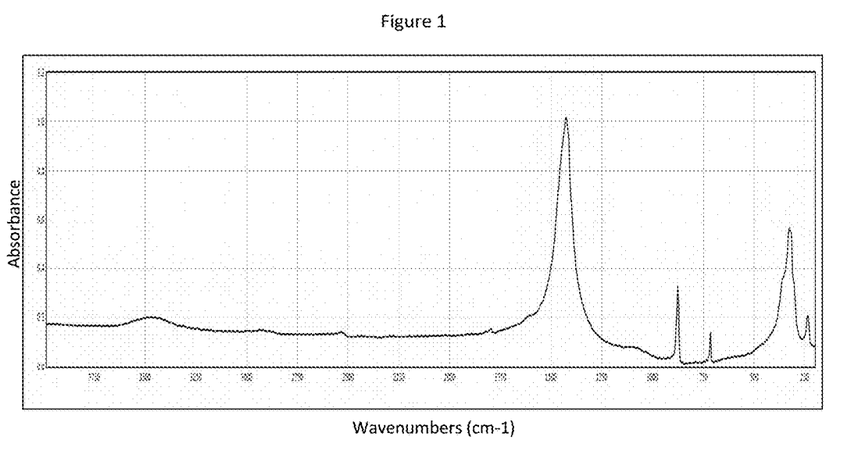
FIG. 1 depicts an Infrared (IR) spectra of crystalline calcite.
Figure 2:
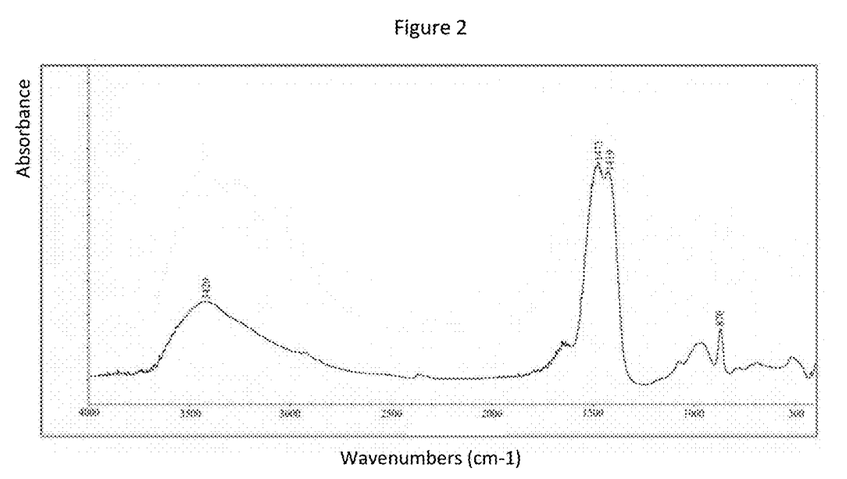
FIG. 2 depicts an IR spectra of amorphous calcium carbonate. Calcite and amorphous calcium carbonate can be distinguished by their infrared spectra. The narrower single peak at ~1450 cm-1, relatively narrow peak at ~873 cm-1, and presence of a peak at 712 cm-1 distinguish calcite in FIG. 1 from the spectra of amorphous calcium carbonate in FIG. 2.
Figure 3:
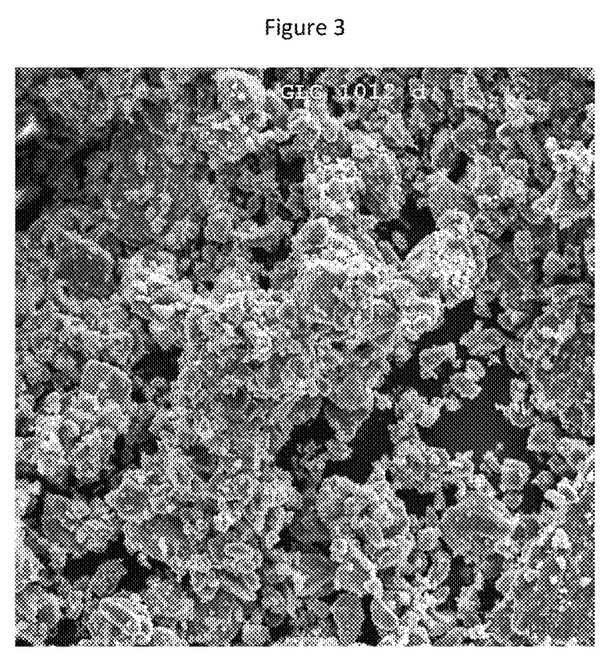
FIG. 3 SEM of GLC 1012 d at 1,000× magnification.

Natural chiral calcite may also be of a geological source. Both chiral crystalline calcite and non-chiral calcite may be constituents of sedimentary rocks such as limestone, chalk, and travertine, and is the primary mineral in metamorphic marble. Much of limestone is formed from the shells of dead marine organisms but does not exhibit the desired combination of crystallography, chemistry, and morphological qualities of the calcium carbonate preferred in the invention. Calcite also occurs as a vein mineral in deposits from hot springs, and it occurs in caverns as stalactites and stalagmites, and may also be found in volcanic or mantle-derived rocks such as carbonatites, kimberlites, or rarely in peridotites. Calcite presents many morphological forms as well a crystalline forms. The preferred morphological form of crystalline calcite is depicted in FIG. 3 and is one that presents substantial nodulation and because of that nodulation, a relatively high specific surface area, (Sa=area m$^2$ g$^{-1}$) as determined by scanning electron microscopy, is preferred.

Figure 4:
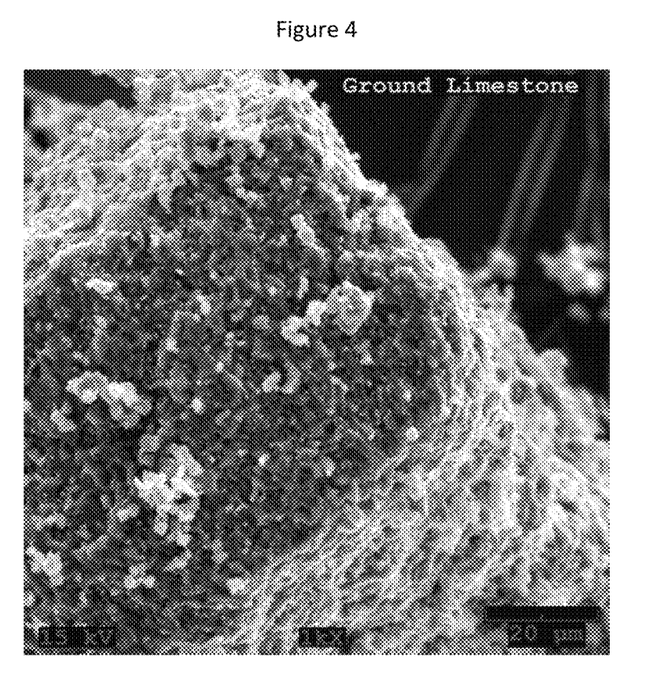
FIG. 4 depicts ground limestone rock at 1,000× magnification.

An example of a typical ground limestone rock (see FIG. 4) used for agronomic purposes that is ground to a fineness of US 200 mesh E11 standard demonstrates a more massive, non-nodular more compacted form of calcium carbonate rock, thus a relatively less specific surface area.

Synthetic crystalline calcite with the preferred chiral index above may also be suitable for use in a composition of the present invention. Synthetic calcite may be prepared from a solution of calcium oxide plus water to give calcium hydroxide, and then carbon dioxide is passed through this solution. Calcite produced using such a procedure is referred to in the industry as precipitated calcium carbonate (PCC). PCC made by introducing the carbon dioxide into an aqueous solution containing calcium hydroxide and organic matter via a microbubble generator to precipitate the desired calcium carbonate with organic matter captured on its surface, comprising 3% to 4% of the precipitated calcium carbonate by weight is preferred. The organic matter may be comprised of polysaccharides, amino acids, peptides, trace amounts of simple sugars. Synthetic calcite may also be produced as a bi-product of some industrial processes such as sugar refining. Sugar refining is the primary and preferred source of synthetic calcite.

In some embodiments, the calcite is precipitated calcite. In other embodiments, the calcite is a natural calcite mined from rocks. In a preferred alternative of these embodiments, the natural calcite is mined calcite supplied by Great Lakes calcite. In yet other embodiments, the calcite is a synthetic calcite. In a preferred alternative of these embodiments, the synthetic calcite is a by-product of the sugar refining industry.

Figure 5:
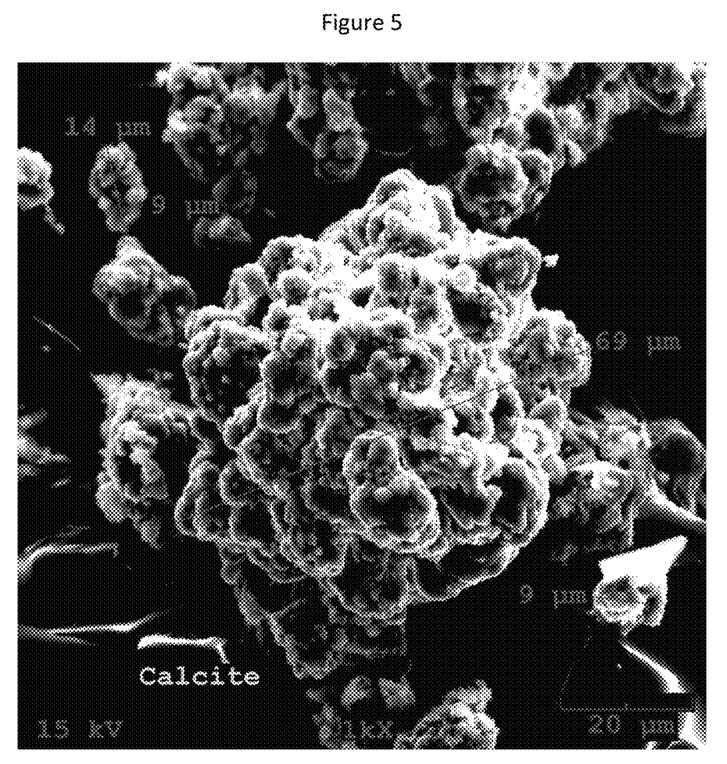
FIG. 5 depicts AMCA calcite at 1,000× magnification.

Preferred particle size of the synthetic calcite is between about 45 and about 75 microns (μm). An example of the preferred nodular physical structure that presents a relatively large specific surface area is pictured on FIG. 5 [AMCA Calcite]. The calcium carbonate equivalent (CCE) analysis is typically performed on limestone calcium carbonate because limestone is used primarily in agriculture as a soil pH adjuster, and as the invention is not for that purpose but to provide a form of bioavailable calcium, a relatively low CCE is desirable. A CCE in the range of 63 to 70 microns is preferred A soil improving composition of the present invention may comprise about 10% to about 20% calcite calcium. Preferably, a soil improving composition comprises from about 12.5% to about 17.5% calcite calcium. Most preferred is a soil improving composition comprising about 15.6% calcite calcium. An exemplary soil improving composition comprises about 15.6% mined calcite calcium supplied by Great Lakes calcite and comprising at least 95% calcite as determined by x-ray diffraction.

A soil improving composition of the instant invention may be in the form of a blend of gypsum, borax, weathered lignite, and calcite calcium ready for application to the soil for improving soil conditions. The composition may be in the form of a loose blend of gypsum, borax, weathered lignite, and calcite calcium. Alternatively, the soil improving composition may be in the form of granules manufactured from the blend of gypsum, borax, weathered lignite, and calcite calcium using agglomeration and pelletizing methods known in the art. The various components have a particle size of about 50 to 100 microns, preferably between 70 to 75 microns.

In some embodiments, a soil amendment composition of the present disclosure may further comprise additional ingredients to adjust the amendment to specific application conditions. For instance, a soil amendment composition may be adjusted to ideally match a specific soil physical, chemical or biochemical property, a specific climate, or a specific type of plant. Alternatively, when a soil amendment composition is further combined with organic matter as described further below, the soil amendment composition may be adjusted to ideally match a specific organic matter to optimally amend the soil.

In one alternative of these embodiments, a composition is further combined with additional calcite. In a preferred alternative of these embodiments, the soil amendment composition is combined with calcite at a ratio of about 10% to about 15% soil amendment composition and about 85% to about 90% calcite.

In another alternative of these embodiments, a composition is further combined with additional gypsum. In a preferred alternative of these embodiments, the soil amendment composition is combined with gypsum at a ratio of about 45% to about 55% soil amendment composition and about 45% to about 55% gypsum.

In yet another alternative of these embodiments, a composition is further combined with compost and additional calcite. In a preferred alternative of these embodiments, the soil amendment composition is combined with compost and additional calcite at a ratio of about 40% to about 50% compost, about 5% to about 6% soil amendment composition, and about 45% to about 55% calcite.

In some embodiments, soil improving compositions of the present invention are further combined with organic material. As described above, when combined with organic material normally used to improve soil conditions, the soil improving composition of the invention significantly improves the soil improving qualities of the organic material. A soil improving composition of the instant invention may be provided in the form of a blend of gypsum, borax, weathered lignite, and calcite calcium ready for combining with organic material before application to the soil.

A soil improving composition may also be provided pre-blended with organic material for application to the soil. The combination of the soil improving composition and organic material may then be used to improve the physical chemical and biochemical properties of the soil. The combination of soil improving composition and organic material may be pelleted, or may be in the form of a loose blend of organic material, gypsum, borax, weathered lignite, and calcite calcium ready for adding to the soil for improving soil conditions. Alternatively, the combination of soil improving composition and organic material may be a loose blend of a pelleted soil improving composition and loose organic material.

In essence, a soil improving composition of the invention is combined with any organic material normally used to improve soil conditions. Soil-improving organic materials are known in the art, and come from something that is or was alive. Organic materials increase soil organic matter content and offer many benefits to the soil and the plants growing in the soil. Organic materials improve soil aeration, water infiltration, and both water- and nutrient-holding capacity of a soil. Many organic materials contain plant nutrients and act as organic fertilizers. Organic materials are also an important energy source for bacteria, fungi and earthworms that live in the soil and are essential for soil and plant health.

A soil improving composition may be combined with any digestible or partly digested organic material normally used to improve soil conditions. Such organic materials are known in the art, and include without limitation, peat, wood chips, grass clippings, straw, biosolids, sawdust, wood ash, compost, undigested organic material from plant or animal origin, raw manure, and composted manure. As used herein, "compost" refers to an organic material comprising decomposed or partially decomposed remnants of organic materials resulting from the breakdown of these materials by bacteria, fungi, and other organisms, i.e., from the composting process.

In preferred embodiments, a soil improving composition of the present invention is combined with livestock manure. Manure may be the solid or semi-solid excrement of different animals, such as cows, pigs, horses, fowl, humans, wild animals, and combinations thereof. Also, manure may be any organic sludge (municipal, slaughterhouse, etc.) or industrial organic residues. The composition of animal waste can and will vary, and depends on both the kind of animal and the way the waste is handled. Poultry operations generally produce dry waste with about 15%-25% moisture, whereas hogs and cattle generate waste that is more liquid. In addition, water is typically used to flush hog and cattle waste out of barns and into storage facilities, thus producing a slurry that can be up to 97% liquid.

When combined with livestock manure, a soil improving composition of the invention is combined with manure at a ratio of about 50 to about 300 lbs of the composition for each ton of manure. Preferably, a soil improving composition of the invention is combined with manure at a ratio of about 100 to 200 lbs of the composition for each ton of manure to improve the manure. Most preferably, a soil improving composition of the invention is combined with manure at a ratio of about 125 lbs of the composition for each ton of manure to improve the manure.

II. Method of Using

In another aspect, a method of using the soil improving composition of the invention is provided. The method comprises applying the soil improving composition to the soil. Therefore, the present invention also relates to a method of amending a soil comprising adding the soil improving composition of the invention to the soil. Additionally, because the soil improving composition of the present invention improves the soil improving qualities of organic material, the present invention is also directed to a method of amending an organic material comprising adding the soil improving composition of the invention to the organic material.

The soil improving composition according to this invention may be applied to soil in a variety of forms in order for the composition to be readily absorbed by the soil and improve the soil quality. For example, the soil improving composition can be prepared in dry form, such as a loose meal or granular form. Alternatively, the soil improving composition can be prepared in liquid form by steeping large mesh bags of the soil improving composition in water. The soil improving composition can also be used with a pearlizer to form small pearls.

The amount of soil improving composition that may be added to a soil can and will vary depending upon physical and chemical conditions of the soil, the moisture conditions of the soil, and the plants to be grown in the soil. In most instances, the soil improving composition may be applied to a soil in an amount of about 500 lbs per acre. In one embodiment, the soil improving composition may be used on corn fields in an amount of between about 200 lbs per acre and about 750 lbs per acre, more preferably between about 300 lbs per acre and about 600 lbs per acre, most preferably about 500 lbs per acre. In another embodiment, the soil improving composition may be used on legume fields in an amount of between about 500 lbs per acre and about 1,000 lbs per acre, more preferably between about 600 lbs per acre and about 800 lbs per acre, and most preferably about 750 lbs per acre. In a further embodiment, the soil improving composition may be used on alfalfa fields in an amount of between about 750 lbs per acre and about 2,000 lbs per acre, more preferably between about 800 lbs per acre and about 1,500 lbs per acre, most preferably about 1,000 lbs per acre.

In certain embodiments where the soil improving composition is prepared in liquid form, the composition may be applied to soil in an amount of between about 0.5 gal per acre and about 15 gal/acre, preferably between about 1 gal per acre and about 10 gal per acre, more preferably between about 1 gal per acre and about 5 gal per acre, and most preferably about 3 gal per acre.

The soil improving composition may be added to the soil before, during or after seeding. The soil improving composition can be added to the soil using seeding equipment, spreaders, or any other type of equipment able to handle granulated amendments and/or fertilizers commonly known in the art.

The amended soil may be used for growing any type of plants. More particularly, the soil may be used for agriculture, horticulture, silviculture, arboriculture, aquiculture (aquaponic, hydroponics, etc.), fruit and vegetable cultures, gardening, or for growing interior plants or potted plants.

A chemical fertilizer, a mineral fertilizer, another soil improving composition, or a mixture thereof, may be added to the soil before, after, or while the soil amendment is being added to the soil. Alternatively, the chemical fertilizer, mineral fertilizer, other soil amendment or mixture thereof may be mixed with the soil improving composition prior to adding to the soil.

Definitions

When introducing elements of the embodiments described herein, the articles "a", "an", "the" and "said" are intended to mean that there are one or more of the elements. The terms "comprising", "including" and "having" are intended to be inclusive and mean that there may be additional elements other than the listed elements.

As used herein, the terms "soil improving composition," "soil amendment" and "soil conditioner," are used interchangeably and refer to a material that is added to the soil for the purpose of improving its physical, chemical and/or biological characteristics and/or providing one or more nutrients to cultivated plants; "amending a soil" means adding a suitable material to a soil in order to improve its physical, chemical and/or biological characteristics and/or provide it with one or more nutrients. Examples of characteristics that may be influenced by soil amendments are: tilth, porosity, aeration, aggregation, texture, moisture-holding capacity, infiltration rates, drainage, nutrients, soil organic matter, cation exchange capacity, microbial viability, the living activities capability of the different microorganisms present in the soils, and the nature and density of these microorganisms.

As various changes could be made in the above compounds, products and methods without departing from the scope of the invention, it is intended that all matter contained in the above description and in the examples given below, shall be interpreted as illustrative and not in a limiting sense.

Examples

The following examples are included to demonstrate preferred embodiments of the invention. It should be appreciated by those of skill in the art that the techniques disclosed in the examples that follow represent techniques discovered by the inventors to function well in the practice of the invention, and thus can be considered to constitute preferred modes for its practice. However, those of skill in the art should, in light of the present invention, appreciate that many changes can be made in the specific embodiments which are disclosed and still obtain a like or similar result without departing from the spirit and scope of the invention.

Example 1: Efficacy of Soil Improving Composition in Improving Soil

The data provided in Table 8 and Table 9 show the average soil improvement observed after using the soil improving composition on three different farms across the United States from 2012 to 2015. The data tracks the improvement in five different areas that are very important in soil improvement, namely: organic matter (OM), soil pH, carbon exchange capacity (CEC), phosphorus and potassium (K). Each of these areas showed improvement over the three year period following application of the soil improving composition.

TABLE 8

| | Organic Matter (OM) | | Soil pH | | Carbon Exchange Capacity (CEC) | | Ratio | |
|---|---|---|---|---|---|---|---|---|
| | 2012 | 2015 | 2012 | 2015 | 2012 | 2015 | 2012 | 2015 |
| Farm A | 2.36 | 3.77 | 8.13 | 8.18 | 28.8 | 20.1 | .29 | .32 |
| Farm B | 3.02 | 4.20 | 6.81 | 6.77 | 15.7 | 15.7 | .45 | .45 |
| Farm C | 3.40 | 3.88 | 7.07 | 7.15 | 16.0 | 15.22 | .45 | .90 |

TABLE 9

| | Phosphorus | | Potassium (K) | | TKN | | Credit | |
|---|---|---|---|---|---|---|---|---|
| | 2012 | 2015 | 2012 | 2015 | 2012 | 2015 | 2012 | 2015 |
| Farm A | 134 | 236 | 666 | 751 | | 2386 | | 301 lb |
| Farm B | 96 | 90 | 218 | 169 | | 2148 | | 271 lb |
| Farm C | 94 | 89 | 165 | 168 | | 2150 | | 271 lb |

Organic matter is an important element in rebuilding the soil and is key in helping the soil retain and release water. Over the three year period, the organic matter was observed to improve in each farm by 1.41%, 1.18% and 0.48%, respectively, for an average improvement of 1.02% over the three year period. Using current methods of cover cropping and no till, building organic matter would normally take anywhere from eight to twenty years before this level of improvement would be achieved. As a result of using the soil amendment composition, the process of improving organic matter can be sped up dramatically and soils can be rebuilt and improved at a much faster rate, which helps cut back reliance on synthetic fertilizers and make producers more profitable in the process. With improved microbial action in the soil, the nitrogen levels in the soil may actually be replaced by the microbial action and will thus alleviate much of the need for continued synthetic nitrogen use in the future.

Example 2: Preparation and Use of a Liquid Soil Improving Composition

A liquid soil improving composition can be prepared by steeping 400 lbs of the soil improving composition in 5000 gallons of water for 24 hours. This can be held in an opaque tank that will shield the microbes from sunlight until ready for use.

The liquid soil improving composition can be applied to soil at a rate of about 3 gallons per acre and can be run through a fertilizer system on a planter while crops are being planted. The liquid soil improving composition can also be used in a foliar feed and sprayed over the crop.

What is claimed is:

1. A soil improving composition comprising gypsum, borax, weathered lignite, and calcite calcium, wherein the composition comprises about 65% to about 75% gypsum, about 1% to about 5% borax, about 5% to about 15% weathered lignite, and about 10% to about 20% calcite calcium.

2. The composition of claim 1, wherein the calcite calcium is selected from mined calcite supplied by Great Lakes calcite, precipitated calcium carbonate, and calcium carbonate byproduct of the sugar industry.

3. The composition of claim 1, wherein the weathered lignite comprises at least about 45% humic acids and at least about 1% hydrophobic fulvic acids.

4. The composition of claim 1, wherein the calcite calcium comprises at least 95% calcite as determined by x-ray diffraction and scanning electron microscopy.

5. The composition of claim 1, wherein the composition is further combined with calcite at a ratio of about 10% to about 15% soil improving composition and about 85% to about 90% calcite.

6. The composition of claim 1, wherein the composition is further combined with gypsum at a ratio of about 45% to about 55% soil improving composition and about 45% to about 55% gypsum.

7. The composition of claim 1, wherein the composition is further combined with compost and calcite at a ratio of about 40% to about 50% compost, about 5% to about 6% soil improving composition, and about 45% to about 55% calcite.

8. The composition of claim 1, wherein the composition is further combined with an organic material.

9. The composition of claim 8, wherein the soil improving composition is combined with the organic material at a rate of about 100 to about 150 lbs for each ton of organic material.

10. The composition of claim 8, wherein the organic material is manure.

11. The composition of claim 10, wherein the manure is selected from the group consisting of composted manure and raw manure.

12. A method of improving soil quality, the method comprising applying the composition of claim 1 to the soil and mixing therewith, wherein the composition is used in an amount of between about 200 lbs per acre to 2,000 lbs per acre, relative to the soil area for treatment.

* * * * *